US008972891B2

(12) United States Patent
Garin et al.

(10) Patent No.: US 8,972,891 B2
(45) Date of Patent: Mar. 3, 2015

(54) METHOD FOR HANDLING OBJECTS REPRESENTING ANNOTATIONS ON AN INTERACTIVE INPUT SYSTEM AND INTERACTIVE INPUT SYSTEM EXECUTING THE METHOD

(75) Inventors: Alexander Garin, Calgary (CA); Ann Dang Pham, Calgary (CA); Kathryn Rounding, Calgary (CA); Kenny Tsang, Calgary (CA); Tom Willekes, Calgary (CA)

(73) Assignee: SMART Technologies ULC (CA)

( * ) Notice: Subject to any disclaimer, the term of this patent is extended or adjusted under 35 U.S.C. 154(b) by 512 days.

(21) Appl. No.: 13/076,638

(22) Filed: Mar. 31, 2011

(65) Prior Publication Data
US 2011/0265034 A1 Oct. 27, 2011

Related U.S. Application Data

(60) Provisional application No. 61/327,985, filed on Apr. 26, 2010.

(51) Int. Cl.
| G06F 3/048 | (2013.01) |
| G06F 3/042 | (2006.01) |
| G06F 3/0481 | (2013.01) |
| G06F 3/0488 | (2013.01) |
| G06K 9/00 | (2006.01) |

(52) U.S. Cl.
CPC .......... *G06F 3/0425* (2013.01); *G06F 3/04812* (2013.01); *G06F 3/04883* (2013.01); *G06F 2203/04109* (2013.01); *G06K 9/00422* (2013.01); *G06K 9/00442* (2013.01)
USPC .......................................... 715/805; 715/702

(58) Field of Classification Search
CPC .......................... G06F 3/04812; G06F 3/0488
USPC ......... 715/805, 810, 802–804, 813, 814, 702, 715/863
See application file for complete search history.

(56) References Cited

U.S. PATENT DOCUMENTS

| 5,404,439 | A | 4/1995 | Moran et al. |
| 5,448,263 | A | 9/1995 | Martin |
| 5,471,578 | A | 11/1995 | Moran et al. |
| 5,784,061 | A | 7/1998 | Moran et al. |

(Continued)

FOREIGN PATENT DOCUMENTS

| AU | 2007286532 B2 | 8/2009 |
| WO | 02/098049 A2 | 12/2002 |

OTHER PUBLICATIONS

Transmittal; International Search Report; and Written Opinion of the International Searching Authority for International Application No. PCT/CA2011/000330, with a mailing date of Jun. 27, 2011.

*Primary Examiner* — Steven Sax
(74) *Attorney, Agent, or Firm* — Katten Muchin Rosenman LLP

(57) ABSTRACT

An interactive input system, method and computer readable medium for handling objects representing annotations on an interactive input system are disclosed. The method includes creating an annotation on the interactive input system, associating the annotation with a temporary grouping region, and in the event that a threshold amount of time passes before a further annotation is created within a threshold distance of the temporary grouping region, disabling the temporary grouping region to thereafter prevent automatic grouping with the annotation of any further annotation.

12 Claims, 13 Drawing Sheets

(56) References Cited

U.S. PATENT DOCUMENTS

| | | |
|---|---|---|
| 5,899,523 A | 5/1999 | Richards et al. |
| 6,054,990 A | 4/2000 | Tran |
| 6,141,000 A | 10/2000 | Martin |
| 6,279,014 B1 * | 8/2001 | Schilit et al. .................. 715/234 |
| 6,320,597 B1 | 11/2001 | Ieperen |
| 6,337,681 B1 | 1/2002 | Martin |
| 6,747,636 B2 | 6/2004 | Martin |
| 6,803,906 B1 | 10/2004 | Morrison et al. |
| 7,232,986 B2 | 6/2007 | Worthington et al. |
| 7,236,162 B2 | 6/2007 | Morrison et al. |
| 7,274,356 B2 | 9/2007 | Ung et al. |
| 7,532,196 B2 * | 5/2009 | Hinckley ...................... 345/156 |
| 2007/0120762 A1 * | 5/2007 | O'Gorman ...................... 345/1.1 |
| 2009/0109231 A1 * | 4/2009 | Kim .............................. 345/581 |
| 2010/0070878 A1 * | 3/2010 | Amento et al. ................ 715/751 |
| 2010/0079409 A1 | 4/2010 | Sirotich et al. |
| 2010/0153835 A1 * | 6/2010 | Xiong et al. ................... 715/230 |
| 2011/0022470 A1 * | 1/2011 | Varadarajan et al. ....... 705/14.61 |
| 2011/0022941 A1 * | 1/2011 | Osborne et al. ............... 715/230 |
| 2011/0040644 A1 * | 2/2011 | Juda et al. .................... 705/26.3 |
| 2012/0221243 A1 * | 8/2012 | Basson et al. ................. 701/468 |

* cited by examiner

METHOD FOR HANDLING OBJECTS REPRESENTING ANNOTATIONS ON AN INTERACTIVE INPUT SYSTEM AND INTERACTIVE INPUT SYSTEM EXECUTING THE METHOD

FIELD OF THE INVENTION

The present invention relates generally to interactive input systems and in particular, to a method for handling objects representing annotations on an interactive input system and an interactive input system executing the method.

BACKGROUND OF THE INVENTION

Interactive input systems that allow users to inject input (e.g. digital ink, mouse events etc.) into an application program using an active pointer (e.g. a pointer that emits light, sound or other signal), a passive pointer (e.g. a finger, cylinder or other suitable object) or other suitable input device such as for example, a mouse or trackball, are known. These interactive input systems include but are not limited to: touch systems comprising touch panels employing analog resistive or machine vision technology to register pointer input such as those disclosed in U.S. Pat. Nos. 5,448,263; 6,141,000; 6,337,681; 6,747,636; 6,803,906; 7,232,986; 7,236,162; and 7,274,356 assigned to SMART Technologies ULC of Calgary, Alberta, Canada, assignee of the subject application, the contents of which are incorporated by reference; touch systems comprising touch panels employing electromagnetic, capacitive, acoustic or other technologies to register pointer input; tablet personal computers (PCs); laptop PCs; personal digital assistants (PDAs); and other similar devices.

Multi-touch interactive input systems that receive and process input from multiple pointers using machine vision are also known. One such type of multi-touch interactive input system exploits the well-known optical phenomenon of frustrated total internal reflection (FTIR). According to the general principles of FTIR, the total internal reflection (TIR) of light traveling through an optical waveguide is frustrated when an object such as a pointer touches the waveguide surface, due to a change in the index of refraction of the waveguide, causing some light to escape from the touch point. In a multi-touch interactive input system, the machine vision system captures images including the point(s) of escaped light, and processes the images to identify the position of the pointers on the waveguide surface based on the point(s) of escaped light for use as input to application programs.

The application programs are often configured to receive the processed touch point data, and to interpret the touch point data as Contact Down, Contact Move, or Contact Up events. In systems where application programs are configured to enable a user to produce freeform ink writing or drawing on a background or canvas, it is often the case that an annotation object is created for each Contact Down-Contact Up cycle. For example, an annotation object representing a freeform letter 'L' would be created upon completion of a Contact Down event at a particular position, a series of Contact Move events together traversing the shape of the 'L', and a Contact Up event at the end. It will be understood that the application programs and annotation objects themselves do not have to be aware that what is drawn in freeform actually represents any particular letter, shape, number etc.

For annotations in particular, it can be useful for an application program to automatically group separate annotation objects into a particular whole. For example, where a user is freeform printing letters of a word, with each letter being represented by a respective annotation object, it is often useful to for the user to be able to easily select the entire word so that it can be manipulated as a word rather than only as discrete letters. While methods are known in which a user can enter a "Selection" mode and manually select various keyboard-typed characters or graphic objects such as icons by manually sweep a pointer across a plurality of graphic objects in order to temporarily group them using a selection box, methods for successfully automating grouping of annotations in particularly useful ways are underdeveloped.

U.S. Pat. No. 6,320,597 to Ieperen discloses a method for editing objects representing writing on an electronic writeboard. During the method, an object representing writing is created on the electronic writeboard, and it is determined if the created object overlies an existing object by at least a threshold amount. The created and existing objects are automatically merged to create a new object if the created object overlies the existing object by at least a threshold amount. While the patent teaches a very useful method and system, it does not contemplate time lapsed between creation of a writing object. As such, created and existing objects may be merged regardless as to how long after the existing object the created object was created. Furthermore, this patent does not contemplate editing of objects in a multi-user interactive input system.

U.S. Pat. No. 5,889,523 to Wilcox et al. discloses a method and apparatus for dynamically grouping a plurality of graphic objects for graphical editing. Graphic objects in a graphical editing system are grouped using hierarchical agglomerative clustering to form a cluster tree. The cluster tree is based on different types of distances, such as time distance and spatial distance, where the different types of distances are combined into a single distance metric. The system permits a user, via a user interface control element, to traverse the cluster tree thereby to cluster a selected graphic object with others dynamically in various ways according to the user's needs. While this approach provides great flexibility for enabling the user to dynamically work with various graphic objects, it is processing intensive and unnecessarily complex. This is primarily because the approach necessitates preserving a high number of potential clustering options for a user, and establishes no particular clusters based on what a user is likely to want or need. Furthermore, this patent does not contemplate clustering of objects in a multi-user interactive input system.

U.S. Pat. No. 5,784,061 to Moran et al. discloses a method and apparatus for representing a group of graphic objects so as to maximize usage of a display area on a computer controlled graphics display system. A means is provided for "collapsing" a group of graphic objects so that the group is represented by a container icon. In order to group graphic objects, a user performs a gesture using an input device on the system at a position close to the graphic objects intended to be grouped.

U.S. Pat. No. 5,471,578 to Moran et al. discloses a graphical editing system which allows a user to manually modify a selection gesture without having to redraw the entire gesture. The system defines a selection with an enclosure that is treated as a graphical object that can be manually contorted in a style consistent with the specific application.

While the above-described prior art systems and methods provide various approaches for grouping annotations and provide varying degrees of automation and complexity, improvements are desired. It is therefore an object of an aspect of the following to provide a novel method of handling objects representing annotations on an interactive input system, and an interactive input system executing the method.

SUMMARY OF THE INVENTION

Accordingly, in one aspect there is provided a method of handling objects representing annotations on an interactive input system, comprising:

creating an annotation on the interactive input system;

associating the annotation with a temporary grouping region; and in the event that a threshold amount of time passes before a further annotation is created within a threshold distance of the temporary grouping region, disabling the temporary grouping region to thereafter prevent automatic grouping with the annotation of any further annotation.

In an embodiment, prior to disabling the temporary grouping region, a further annotation is created on the interactive input system within the threshold distance of the temporary grouping region. An identifier of an input stream used to create the annotation with an identifier of the input stream used to created the further annotation are compared. In the event that the input stream identifiers are the same, the further annotation is associated with the temporary grouping region and the further annotation is added to an annotation group. In an embodiment, in the event that the input stream identifiers are not the same, the further annotation is associated with a further temporary grouping region.

In another aspect there is provided an interactive input system comprising:

a display surface; and processing structure communicating with the display surface, the processing structure displaying an annotation on the display surface, associating the annotation with a temporary grouping region and, in the event that a threshold amount of time passes before a further annotation is created within a threshold distance of the temporary grouping region, disabling the temporary grouping region to thereafter prevent automatic grouping with the annotation of any further annotation.

In another aspect there is provided a computer readable medium embodying a computer program for handling objects representing annotations on an interactive input system, the computer program comprising:

computer program code for creating an annotation on the interactive input system;

computer program code for associating the annotation with a temporary grouping region; and computer program code for disabling the temporary grouping region to thereafter prevent automatic grouping with the annotation of any further annotation, in the event that a threshold amount of time passes before a further annotation is created within a threshold distance of the temporary grouping region.

The method and system disclosed herein enable delimiting of grouping of annotations based on distance of a further annotation from the temporary grouping region, and also based on whether a further annotation is made within a threshold amount of time. By providing for the automatic disabling of a temporary grouping region, the flexibility of automatic grouping based on proximity and time is provided without the complexity and processing intensity normally associated with prior art systems that attempt to maintain a high number of grouping options, rather than actual groups. Embodiments comparing identifiers of input streams used to create annotations are capable of providing significant advantages in multiple user scenarios where automatic grouping of each user's respective annotations is desired.

BRIEF DESCRIPTION OF THE DRAWINGS

Embodiments will now be described more fully with reference to the accompanying drawings in which.

DETAILED DESCRIPTION OF THE EMBODIMENTS

The following provides a method for handling objects representing annotations on an interactive input system, and an interactive input system executing the method. While the following describes the method executed in one particular type of interactive input system, it will be understood that the method may be used in various types of interactive input systems. For example, the method is quite suitable for execution in interactive input systems such as those described above, that are capable of receiving an input stream and creating annotations such as ink or freeform drawings in response thereto.

Figure 1:
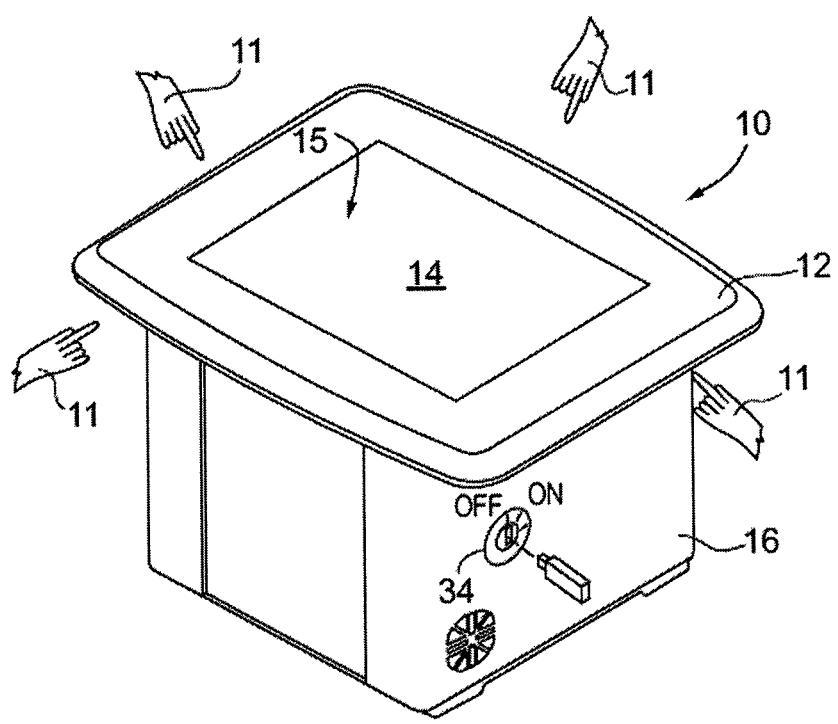
FIG. 1 is a perspective view of an interactive input system.

Turning now to FIG. 1, a perspective diagram of an interactive input system in the form of a touch table is shown and is generally identified by reference numeral 10. Touch table 10 comprises a table top 12 mounted atop a cabinet 16. In this embodiment, cabinet 16 sits atop wheels, castors or the like 18 that enable the touch table 10 to be easily moved from place to place as requested. Integrated into table top 12 is a coordinate input device in the form of a frustrated total internal reflection (FTIR) based touch panel 14 that enables detection and tracking of one or more pointers 11, such as fingers, pens, hands, cylinders, or other objects, applied thereto.

Figure 2A:
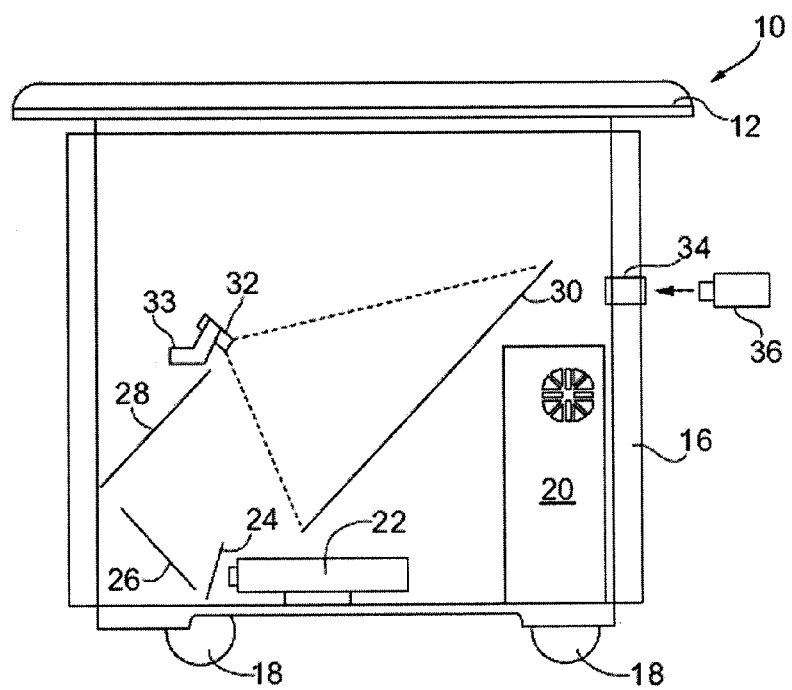
FIG. 2A is a side sectional view of the interactive input system of FIG. 1.

Cabinet 16 supports the table top 12 and touch panel 14, and houses processing structure 20 (see FIG. 2A) executing a host application and one or more application programs. Image data generated by the processing structure 20 is displayed on the touch panel 14 allowing a user to interact with the displayed image via pointer contacts on the display surface 15 of the touch panel 14. The processing structure 20 interprets pointer contacts as input to the running application program and updates the image data accordingly so that the image displayed on the display surface 15 reflects the pointer activity. In this manner, the touch panel 14 and processing structure 20 allow pointer interactions with the touch panel 14 to be recorded as handwriting or drawing or used to control execution of the application program.

Processing structure 20 in this embodiment is a general purpose computing device in the form of a computer. The computer comprises for example, a processing unit, system memory (volatile and/or non-volatile memory), other non-removable or removable memory (a hard disk drive, RAM, ROM, EEPROM, CD-ROM, DVD, flash memory etc.) and a system bus coupling the various computer components to the processing unit.

During execution of the host software application/operating system run by the processing structure 20, a graphical user interface comprising a canvas page or palette (i.e. a background), upon which graphic widgets are displayed, is displayed on the display surface of the touch panel 14. In this embodiment, the graphical user interface enables freeform or handwritten ink objects ("annotations") and other objects to be input and manipulated via pointer interaction with the display surface 15 of the touch panel 14.

The cabinet 16 also houses a horizontally-oriented projector 22, an infrared (IR) filter 24, and mirrors 26, 28 and 30. An imaging device 32 in the form of an infrared-detecting camera is mounted on a bracket 33 adjacent mirror 28. The system of mirrors 26, 28 and 30 functions to "fold" the images projected by projector 22 within cabinet 16 along the light path without unduly sacrificing image size. The overall touch table 10 dimensions can thereby be made compact.

The imaging device 32 is aimed at mirror 30 and thus sees a reflection of the display surface 15 in order to mitigate the appearance of hotspot noise in captured images that typically must be dealt with in systems having imaging devices that are directed at the display surface itself. Imaging device 32 is positioned within the cabinet 16 by the bracket 33 so that it does not interfere with the light path of the projected image.

During operation of the touch table 10, processing structure 20 outputs video data to projector 22 which, in turn, projects images through the IR filter 24 onto the first mirror 26. The projected images, now with IR light having been substantially filtered out, are reflected by the first mirror 26 onto the second mirror 28. Second mirror 28 in turn reflects the images to the third mirror 30. The third mirror 30 reflects the projected video images onto the display (bottom) surface of the touch panel 14. The video images projected on the bottom surface of the touch panel 14 are viewable through the touch panel 14 from above. The system of three mirrors 26, 28, configured as shown provides a compact path along which the projected image can be channeled to the display surface. Projector 22 is oriented horizontally in order to preserve projector bulb life, as commonly-available projectors are typically designed for horizontal placement.

An external data port/switch, in this embodiment a Universal Serial Bus (USB) port/switch 34, extends from the interior of the cabinet 16 through the cabinet wall to the exterior of the touch table 10 providing access for insertion and removal of a USB key 36, as well as switching of functions.

The USB port/switch 34, projector 22, and imaging device 32 are each connected to and managed by the processing structure 20. A power supply (not shown) supplies electrical power to the electrical components of the touch table 10. The power supply may be an external unit or, for example, a universal power supply within the cabinet 16 for improving portability of the touch table 10. The cabinet 16 fully encloses its contents in order to restrict the levels of ambient visible and infrared light entering the cabinet 16 thereby to facilitate satisfactory signal to noise performance. Doing this can compete with various techniques for managing heat within the cabinet 16. The touch panel 14, the projector 22, and the processing structure are all sources of heat, and such heat if contained within the cabinet 16 for extended periods of time can reduce the life of components, affect performance of components, and create heat waves that can distort the optical components of the touch table 10. As such, the cabinet 16 houses heat managing provisions (not shown) to introduce cooler ambient air into the cabinet while exhausting hot air from the cabinet. For example, the heat management provisions may be of the type disclosed in U.S. patent application Ser. No. 12/240,953 to Sirotich et al., filed on Sep. 29, 2008 entitled "TOUCH PANEL FOR INTERACTIVE INPUT SYSTEM AND INTERACTIVE INPUT SYSTEM EMPLOYING THE TOUCH PANEL" and assigned to SMART Technologies ULC of Calgary, Alberta, the assignee of the subject application, the content of which is incorporated herein by reference.

Figure 2B:
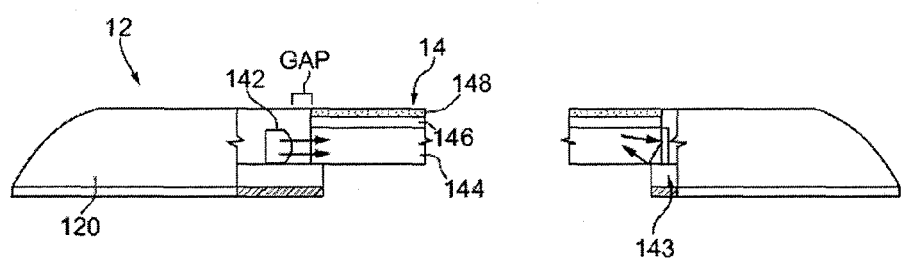
FIG. 2B is a sectional view of a table top and touch panel forming part of the interactive input system of FIG. 1.

As set out above, the touch panel 14 of touch table 10 operates based on the principles of frustrated total internal reflection (FTIR), as described in further detail in the above-mentioned U.S. patent application Ser. No. 12/240,953 to Sirotich et al., referred to above. FIG. 2B is a sectional view of the table top 12 and touch panel 14. Table top 12 comprises a frame 120 formed of plastic supporting the touch panel 14.

Touch panel 14 comprises an optical waveguide 144 that, according to this embodiment, is a sheet of acrylic. A resilient diffusion layer 146, in this embodiment a layer of V-CARE® V-LITE® barrier fabric manufactured by Vintex Inc. of Mount Forest, Ontario, Canada, or other suitable material lies against the optical waveguide 144.

The diffusion layer 146, when pressed into contact with the optical waveguide 144, substantially reflects the IR light escaping the optical waveguide 144 so that the escaping IR light travels down into the cabinet 16. The diffusion layer 146 also diffuses visible light being projected onto it in order to display the projected image.

Overlying the resilient diffusion layer 146 on the opposite side of the optical waveguide 144 is a clear, protective layer 148 having a smooth touch surface. In this embodiment, the protective layer 148 is a thin sheet of polycarbonate material over which is applied a hardcoat of Marnoto material, manufactured by Tekra Corporation of New Berlin, Wisconsin, U.S.A. While the touch panel 14 may function without the protective layer 148, the protective layer 148 permits use of the touch panel 14 without undue discoloration, snagging or creasing of the underlying diffusion layer 146, and without undue wear on users' fingers. Furthermore, the protective layer 148 provides abrasion, scratch and chemical resistance to the overall touch panel 14, as is useful for panel longevity.

The protective layer 148, diffusion layer 146, and optical waveguide 144 are clamped together at their edges as a unit and mounted within the table top 12. Over time, prolonged use may wear one or more of the layers. As desired, the edges of the layers may be unclamped in order to inexpensively provide replacements for the worn layers. It will be understood that the layers may be kept together in other ways, such as by use of one or more of adhesives, friction fit, screws, nails, or other fastening methods.

An IR light source comprising a bank of infrared light emitting diodes (LEDs) 142 is positioned along at least one side surface of the optical waveguide 144 (into the page in FIG. 2b). Each LED 142 emits infrared light into the optical waveguide 144. In this embodiment, the side surface along which the IR LEDs 142 are positioned is flame-polished to facilitate reception of light from the IR LEDs 142. An air gap of 1-2 millimeters (mm) is maintained between the IR LEDs 142 and the side surface of the optical waveguide 144 in order to reduce heat transmittance from the IR LEDs 142 to the optical waveguide 144, and thereby mitigate heat distortions in the acrylic optical waveguide 144. Bonded to the other side surfaces of the optical waveguide 144 is reflective tape 143 to reflect light back into the optical waveguide 144 thereby saturating the optical waveguide 144 with infrared illumination.

In operation, IR light is introduced via the flame-polished side surface of the optical waveguide 144 in a direction generally parallel to its large upper and lower surfaces. The IR light does not escape through the upper or lower surfaces of the optical waveguide 144 due to total internal reflection (TIR) because its angle of incidence at the upper and lower surfaces is not sufficient to allow for its escape. The IR light reaching other side surfaces is generally reflected entirely back into the optical waveguide 144 by the reflective tape 143 at the other side surfaces.

Figure 2C:
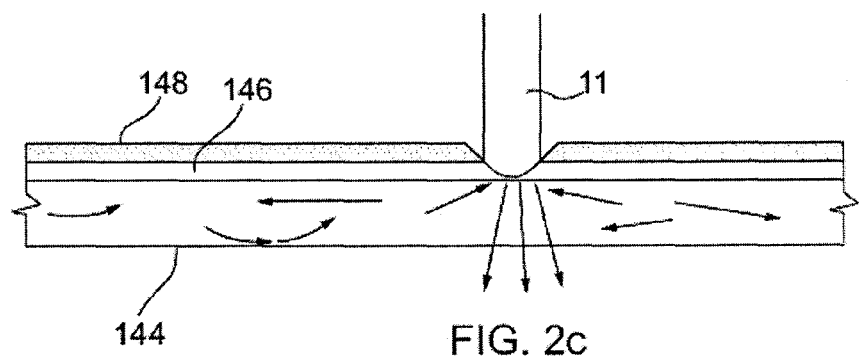
FIG. 2C is a sectional view of the touch panel of 2B, having been contacted by a pointer.

As shown in FIG. 2c, when a user contacts the display surface of the touch panel 14 with a pointer 11, the pressure of the pointer 11 against the protective layer 148 compresses the resilient diffusion layer 146 against the optical waveguide 144, causing the index of refraction on the optical waveguide 144 at the contact point of the pointer 11, or "touch point," to change. This change "frustrates" the TIR at the touch point causing IR light to reflect at an angle that allows it to escape from the optical waveguide 144 in a direction generally perpendicular to the plane of the optical waveguide 144 at the touch point. The escaping IR light reflects off of the point 11 and scatters locally downward through the optical waveguide 144 and exits the optical waveguide 144 through its bottom surface. This occurs for each pointer 11 as it contacts the display surface of the touch panel 114 at a respective touch point.

As each touch point is moved along the display surface 15 of the touch panel 14, the compression of the resilient diffusion layer 146 against the optical waveguide 144 occurs and thus escaping of IR light tracks the touch point movement. During touch point movement or upon removal of the touch point, decompression of the diffusion layer 146 where the touch point had previously been due to the resilience of the diffusion layer 146, causes escape of IR light from optical waveguide 144 to once again cease. As such, IR light escapes from the optical waveguide 144 only at touch point location (s) allowing the IR light to be captured in image frames acquired by the imaging device.

The imaging device 32 captures two-dimensional, IR video images of the third mirror 30. IR light having been filtered from the images projected by projector 22, in combination with the cabinet 16 substantially keeping out ambient light, ensures that the background of the images captured by imaging device 32 is substantially black. When the display surface 15 of the touch panel 14 is contacted by one or more pointers as described above, the images captured by IR camera 32 comprise one or more bright points corresponding to respective touch points. The processing structure 20 receives the captured images and performs image processing to detect the coordinates and characteristics of the one or more bright points in the captured image that represent touch points. The touch point coordinates are then mapped to display coordinates.

With the touch point coordinates having been mapped to display coordinates, a host application tracks each touch point, and handles continuity processing between image frames. More particularly, the host application receives touch point data from frames and based on the touch point data determines whether to register a new touch point, modify an existing touch point, or cancel/delete an existing touch point.

Thus, the host application registers a Contact Down event representing a new touch point when it receives touch point data that is not related to an existing touch point, and accords the new touch point a unique identifier. Touch point data may be considered unrelated to an existing touch point if it characterizes a touch point that is a threshold distance away from an existing touch point, for example. The host application registers a Contact Move event representing movement of the touch point when it receives touch point data that is related to an existing pointer, for example by being within a threshold distance of, or overlapping an existing touch point, but having a different focal point. The host application registers a Contact Up event representing removal of the touch point from the surface of the touch panel 14 when touch point data that can be associated with an existing touch point ceases to be received from subsequent images. The Contact Down, Contact Move and Contact Up events are passed to respective elements of the user interface such as graphical objects, widgets, or the background/canvas, based on the element with which the touch point is currently associated, and/or the touch point's current position. These events are then interpreted as mouse or ink events by application programs running on the processing structure 20.

Figure 2D:
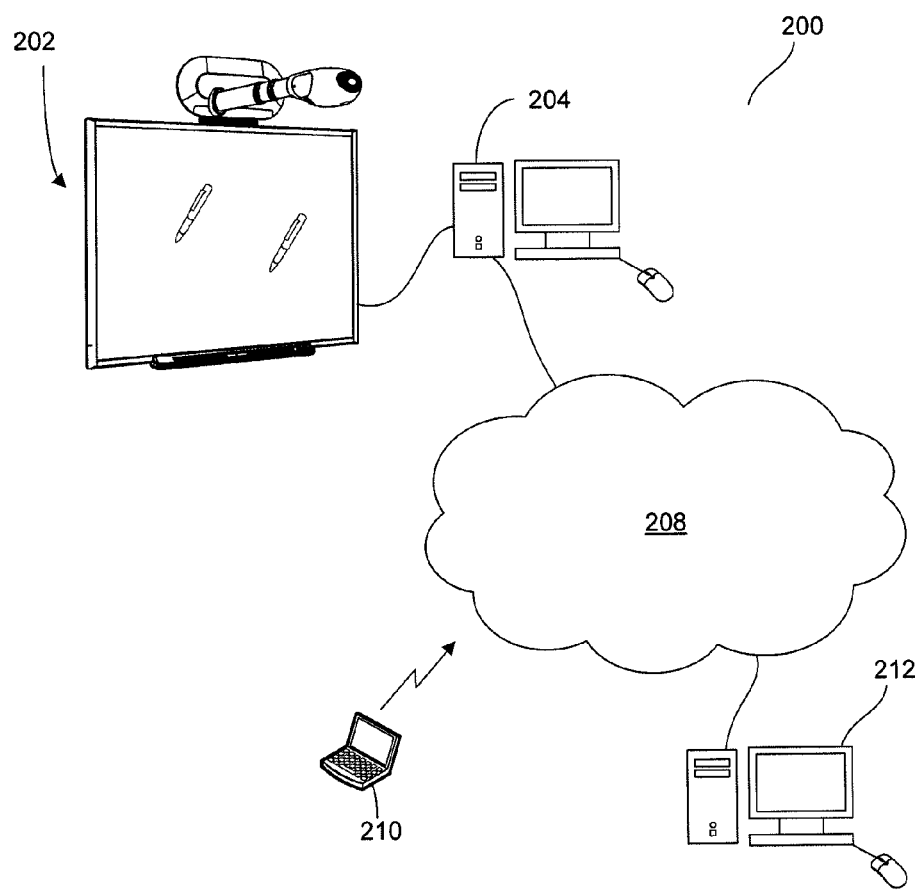
FIG. 2D illustrates an alternative embodiment of the interactive input system.

FIG. 2d illustrates an alternative embodiment of the interactive input system 200. In this embodiment, an interactive whiteboard (IWB) 202 is connected to a host computer 204, allowing multiple pointers (stylus, finger, mouse, etc.) to write on the interactive surface of the IWB 202. The host computer 204 is connected to a network 208 (Local Area Network, Internet, etc.) to receive inputs from remote computers 210 and 212 that are connected to the network via wireless or wired means, respectively, to allow the users of the remote computers to input to the interactive input surface of the IWB 202.

In embodiments, application programs configured to enable each user to produce freeform ink writing or drawing on a background or canvas create an annotation object for ink between the Contact Down and Contact Up events. However, for annotations in particular, it can be useful to automatically group separate annotation objects into a particular whole. For example, where a user is freeform printing letters of a word, with each letter being represented by a respective annotation object, it is often useful for a user to be able to easily select the entire word so that the entire word can be manipulated through editing, scaling, translating, and so forth.

Figure 2E:
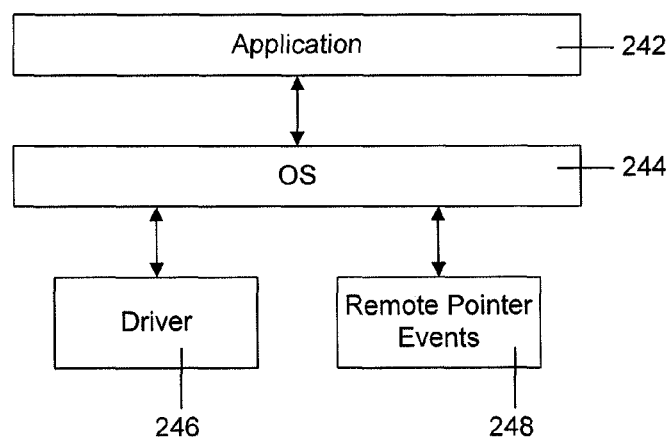
FIG. 2E shows a software structure of an interactive input system.

FIG. 2E shows the software structure of the interactive input system. Application 242 communicates with the operating system (OS) 244 of the host computer 204 to receive input streams, and interprets the input streams as ink annotations. The input streams are provided to the OS 244 by the driver (e.g., the mouse driver and/or IWB driver) 246, and, if remote computers are connected to the host computer 204, by the remote pointer events 248 originating from the remote computers.

As will be described in more detail, the application 242 adapts to a variety of system configurations and a variety of IWB hardware. The application 242 identifies input of ink annotations from various input streams and automatically groups ink annotations generated from each input device (e.g., a stylus, a finger, a mouse, or an ink annotation originating on a remote device) according to a set of rules.

Figure 2F:
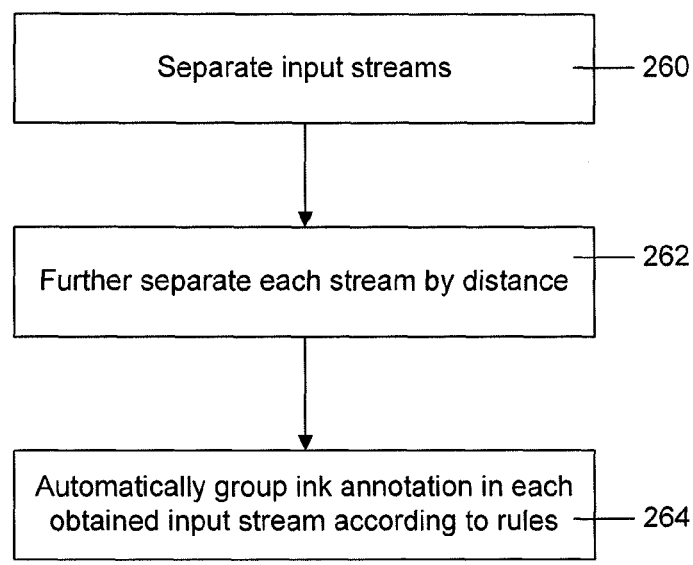
FIG. 2F shows a top level flowchart of a method of ink annotation auto-grouping implemented in the interactive input system.

FIG. 2F shows the top level flowchart of the method of automatically grouping ink annotations, that is implemented in the interactive input system. When the host computer 204 receives inputs, it first the separate inputs into different input streams according to differentiable identities (e.g., device type and ID) of the input device or source (step 260). For example, inputs with a mouse ID will be treated as a mouse input stream associated with the identified mouse ID.

An input stream is identified with an input stream identifier that is allocated at the board or firmware level. For example, a locally connected mouse will cause Contact Down/Move/Up events that are associated with an input stream identifier that is different from the input stream identifier associated with Contact Down/Move/Up events caused by a pointer contacting a touch surface of the interactive input system. Furthermore, the interactive input system tracks whether a tool has changed for a given input stream (such as from a red pen pointer to a blue pen pointer) and will affect grouping as will be described.

In a system having multiple mice, each mouse will thereby generate a unique input stream. Similarly, stylus inputs with an ID will be identified as a stylus input stream associated with the ID. In a system in which the IWB driver differentiates between multiple styluses using their different IDs, each stylus ID will correspond to a separate input stream. In a system in which the IWB driver detects multiple simultaneous stylus inputs but cannot differentiate them, the multiple inputs will be as one input stream.

At step 262, the system examines each input stream to further split an input stream into multiple streams, if possible. In this case, the touch inputs, which are identified as one input stream at step 260, are examined at step 262. If the location on the interactive surface at which a touch input $P_1$ occurred at time $t_1$ is within a threshold distance from the location at which another touch input $P_2$ occurred at time $t_2$, and the difference in time between $t_1$ and $t_2$ is within a threshold amount, the touch inputs $P_1$ and $P_2$ are recorded as part of the same input stream. However, if $P_1$ is located outside of a threshold distance from $P_2$ then $P_1$ and $P_2$ are recorded as two distinct input streams. The separation of input streams is also subject to other criteria, as will be described in more detail below.

At step 264, the system checks each input stream obtained from step 262 and automatically groups annotations in each input stream according to a number of rules.

Provided that there has not been a tool change such as the change from a red pen to a blue pen, or to a highlighter, for some examples, or there has been a change in line type from solid to dashed, for another example, an annotation object created from an input stream is automatically grouped with a previously-created annotation object under certain conditions. In particular, if the annotation object and the previously-created annotation object were created from input streams having the same input stream identifier, they are automatically grouped together if the annotation object was created at a location that is within a threshold distance from the previously-created annotation object, and also was created before expiry of a threshold amount of time from the time of creation of the previously-created annotation object.

Thus, for a given input stream, and given tool being used to create the input stream, an annotation object that, for example, is intended to represent a letter in a word, is automatically grouped with an existing annotation object that is located within a threshold distance of the annotation object and that itself was created no more than a threshold amount of time prior to creation of the annotation object. Similarly, the annotation object is automatically grouped with a further annotation object, if the further annotation object is created at a location that is within a threshold distance of the annotation object and is itself created no more than a threshold amount of time after creation of the (just previously created) annotation object. In this embodiment, the threshold amount of time is 2 seconds, and the threshold distance is 20 pixels. In an alternative embodiment, the threshold amount of time can be up to 3 seconds, and/or the threshold distance can be up to 200 pixels. Other thresholds may be defined within these ranges or outside of them, depending on the implementation requirements for the application. However, in general, it is advantageous if a user using ink to input letters of a word all within the same annotation region, and without significant pauses between letters, experiences the grouping of the individual letters, so that the letters can be treated collectively as a word.

Figure 3:
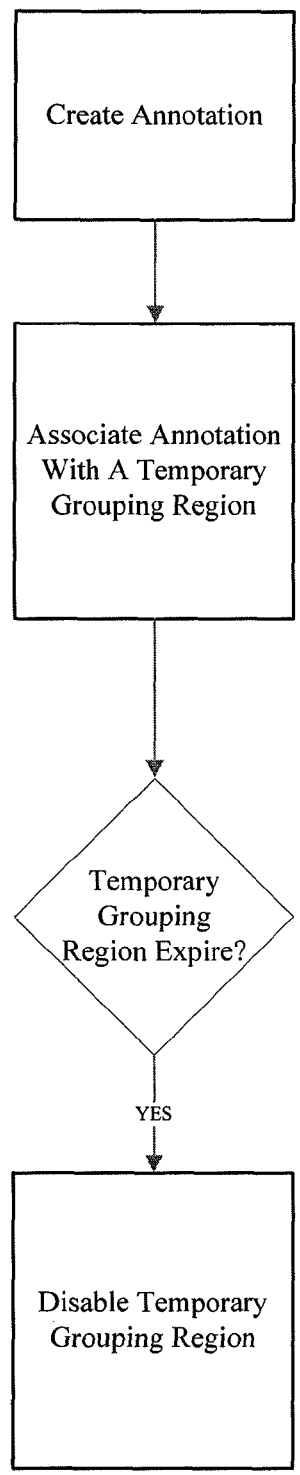
FIG. 3 is a flowchart showing a method for handling annotation objects.

Advantageously, a mechanism is provided for preventing further annotations from being automatically grouped with one or more existing annotations. Turning now to FIG. 3, there is provided a method of handling annotation objects 300 that includes creating an annotation (step 310), associating the annotation with a temporary grouping region (step 320) and, in the event that the temporary grouping region expires (step 330), disabling the temporary grouping region to thereafter prevent automatic grouping with the annotation of any further annotation (step 340). In this embodiment, the temporary grouping region expires in the event that a threshold amount of time passes before a further annotation is created within a threshold distance of the temporary grouping region. In general, this means that two annotations that are created at sufficiently separate times will not be grouped together, despite their perhaps being created physically close to each other.

Figure 4:
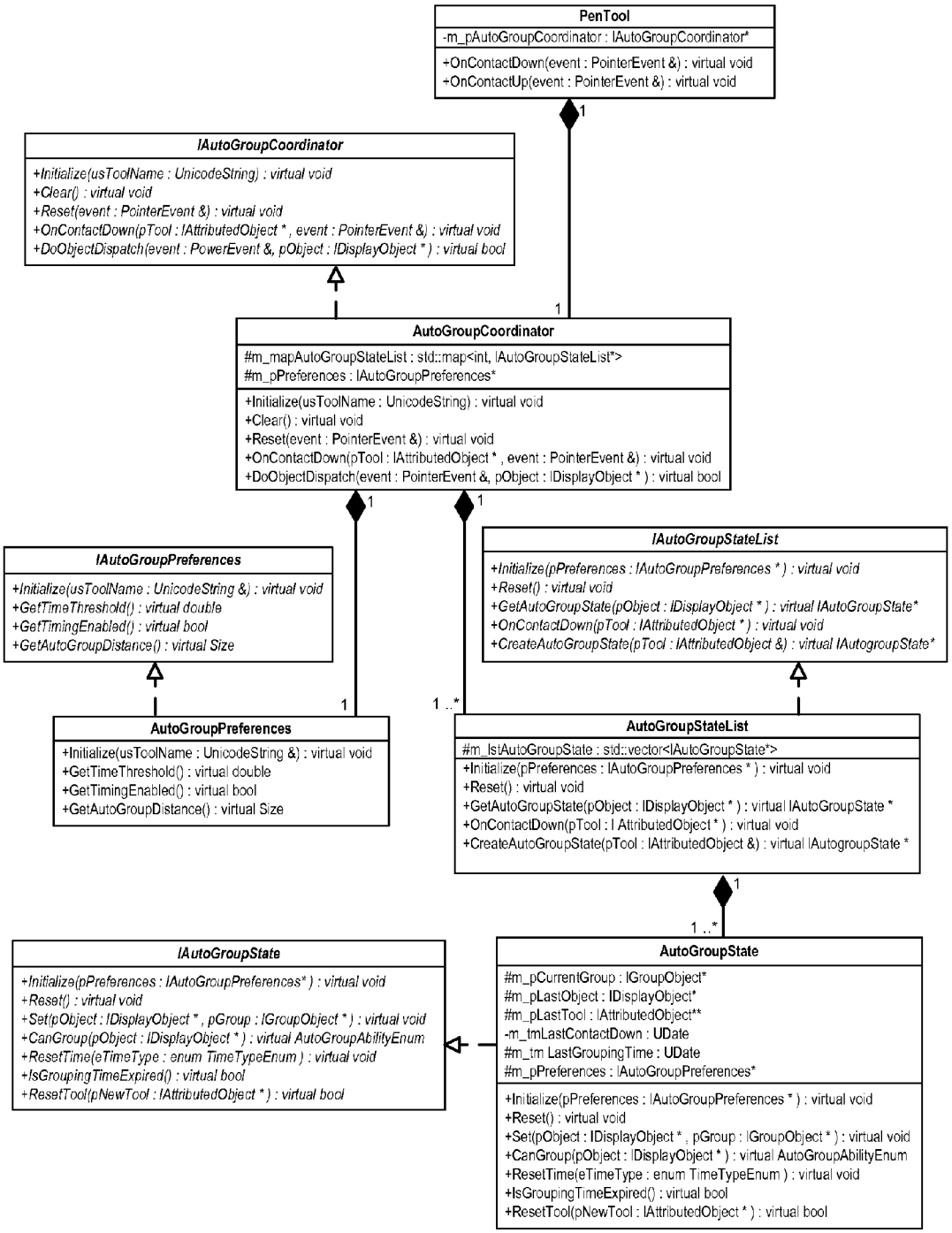
FIG. 4 is a class diagram showing relationships between objects in an automatic annotation grouping system.

Turning now to FIG. 4, there is shown a class diagram of relationships between classes from which objects are derived in an automatic annotation grouping system, according to this embodiment. An AutoGroupCoordinator class is derived from the IAutoGroupCoordinator interface, which exposes two main methods as available upon occurrence of contact events. These two main methods are the OnContactDown method and the OnObjectDispatch method. The AutoGroupCoordinator object contains a collection of AutoGroupState objects. AutoGroupState objects are grouped into lists of objects, represented by objects of the AutoGroupStateList class, according to the input stream used to create the objects. More particularly, an AutoGroupStateList object is created for each input stream being used with the interactive input system. For example, an input stream from a mouse that is locally connected to the interactive input system is associated with an AutoGroupStateList object, and an input stream from a pointer being used to interact with a touch surface of the interactive input stream is associated with a different AutoGroupStateList object. It will be understood that different types of pointers used to interact with such a touch surface may represent different input streams and may therefore be associated with respective AutoGroupStateList objects. Similar to the AutoGroupCoordinator class, the AutoGroupStateList and AutoGroupState classes are derived respectively from interface classes IAutoGroupStateList and IAutoGroupState.

The AutoGroupReferences class is a data structure representing user preferences, and is shared between multiple AutoGroupState objects. The AutoGroupReferences class is instantiated once per AutoGroupCoordinator lifetime, and encapsulates Get( )methods exposed through IAutoGroupReferences for reading preferences stored in the AutoGroupReferences object.

An AutoGroupState object represents a temporary grouping region, and permits several persistent states that are used for the automatic grouping of annotations. For example, the IAutoGroupState interface exposes a CanGroup( ) method, which receives a newly created annotation object exposed through an IDisplayObject interface as a parameter. The CanGroup( ) method returns an enumerator that specifies how the newly created annotation object can be dispatched. For example, the CanGroup( ) method may specify that the newly created annotation object can be dispatched to the group associated with the AutoGroupState object, can be dispatched to a newly created group for association with the AutoGroupState object along with the previously-created annotation object, or can be dispatched without being associated with a group.

Figure 5:
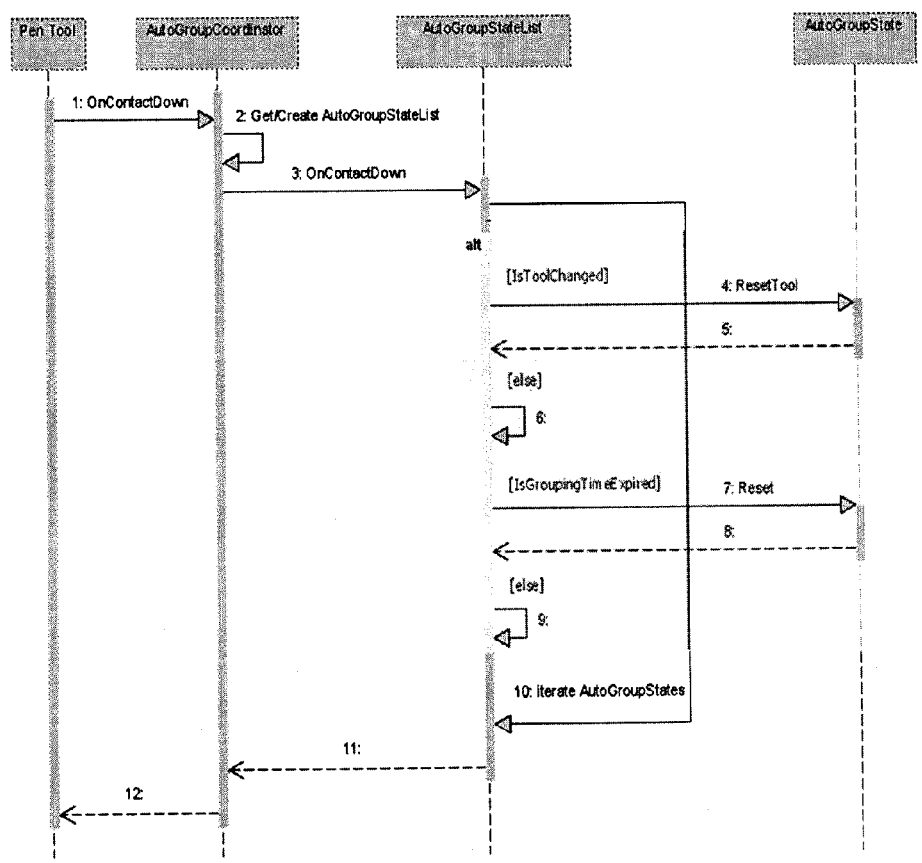
FIG. 5 is a sequence diagram showing function calls and events subsequent to a Contact Down event that initiates the creation of an annotation object.
Figure 6:
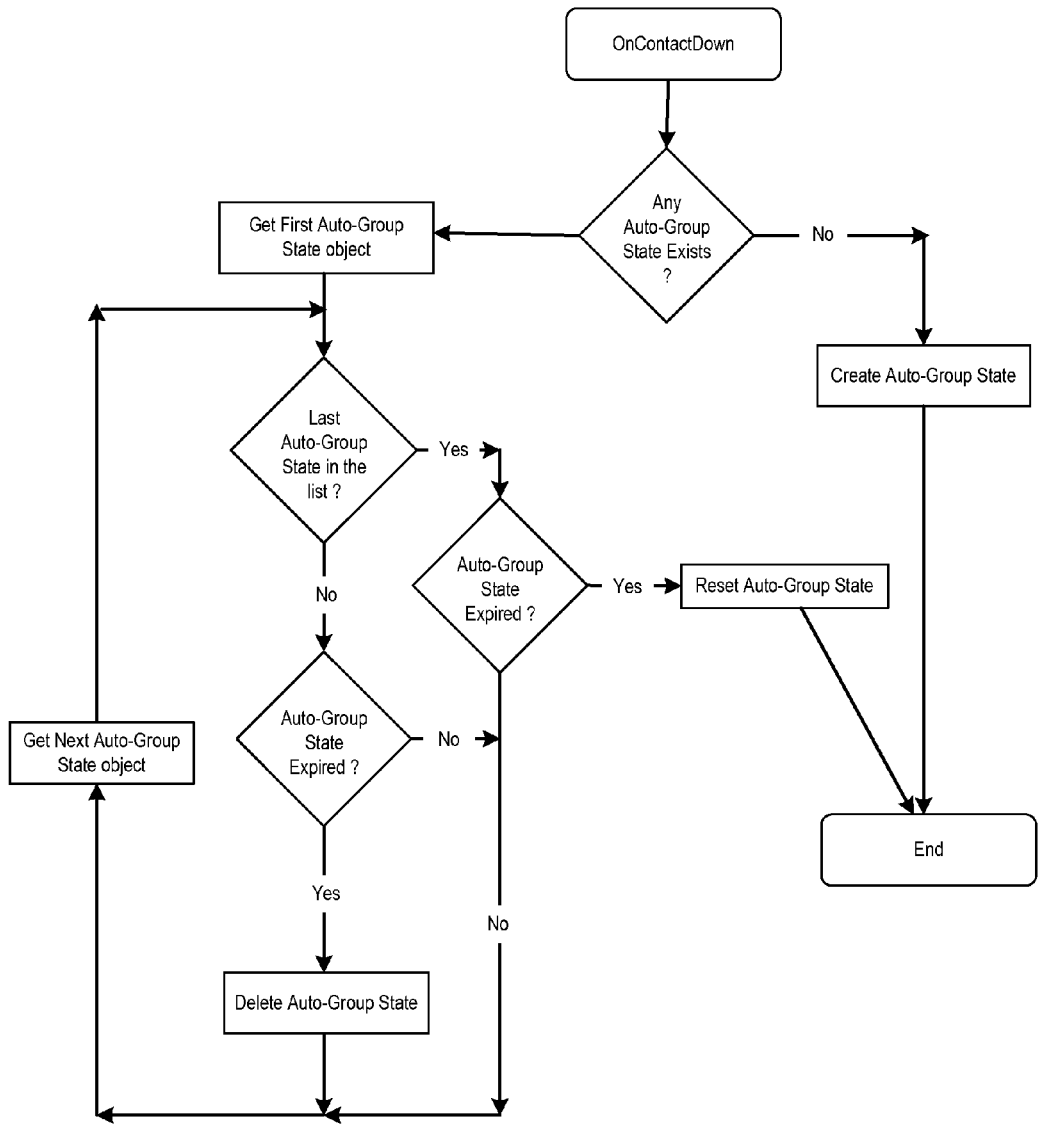
FIG. 6 is a flowchart showing steps taken subsequent to a Contact Down event.

When a Contact Down event occurs, for example as triggered by a pen tool, the automatic annotation grouping system prepares for the potential of grouping of the annotation object being created, as shown in FIGS. 5 and 6. During preparation, the AutoGroupStateList object associated with the input stream being used to create the annotation object is consulted by the AutoGroupCoordinator object for a list of AutoGroupState objects associated with that input stream. If the AutoGroupStateList object for the input stream being used to create the object does not yet exist, the AutoGroupStateList object is created, and an AutoGroupState object is created and added to the AutoGroupStateList. On the other hand, if the AutoGroupStateList object for the input stream being used to create the object already exists, then each AutoGroupState object in the list is checked to determine whether there has been a tool change since the previous Contact Up event for that input stream. This is done by invoking an IsToolChanged method and receiving the result. Each AutoGroupState object in the list is also checked to determine whether the threshold amount of time has passed since the last Contact Up event for that input stream, by invoking an IsGroupTimeExpired method and receiving the result. Thus, if there has been a tool change since the last Contact Up event, or if the threshold amount of time has passed since the last Contact Up event for that input stream, then the AutoGroupState object being tested may be disabled (i.e. reset) to thereafter prevent further annotations from being grouped with the annotations in the group associated with the AutoGroupState object. This process is iterated through all of the AutoGroupState objects in the AutoGroupStateList for the input stream.

With the exception of the last AutoGroupState object in the AutoGroupStateList, an AutoGroupState object is disabled as indicated above by removing it from the AutoGroupStateList and destroying it. The last AutoGroupState object in the AutoGroupStateList is not removed from the AutoGroupStateList or destroyed but is disabled by resetting it to clear all of its references and resetting its expiry time. The reason the last AutoGroupState object in the AutoGroupStateList is not removed or destroyed is simply so that it can be re-used thereby to improve performance by avoiding having to re-create another AutoGroupState object.

Figure 7:
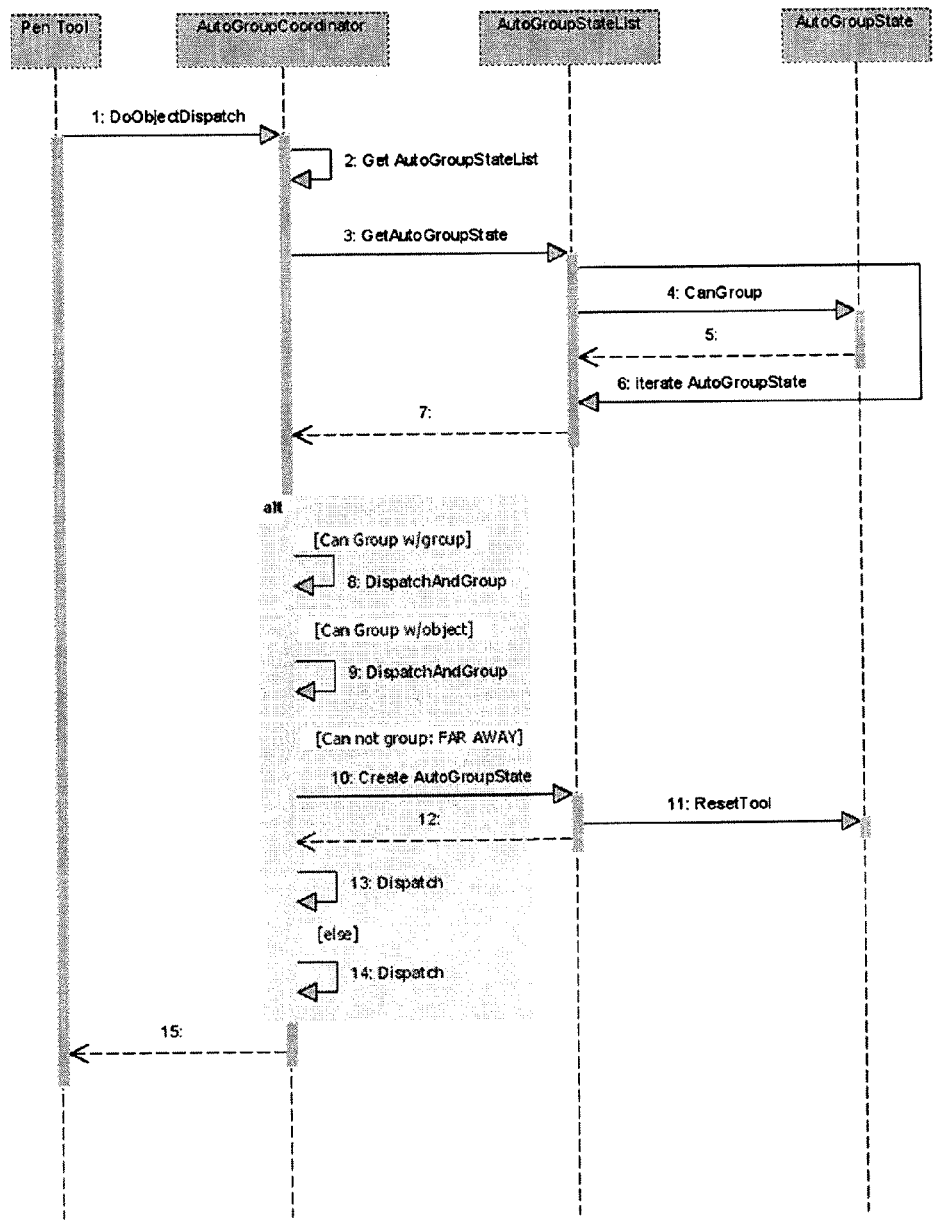
FIG. 7 is a sequence diagram showing function calls and events for dispatching a created annotation object.
Figure 8:
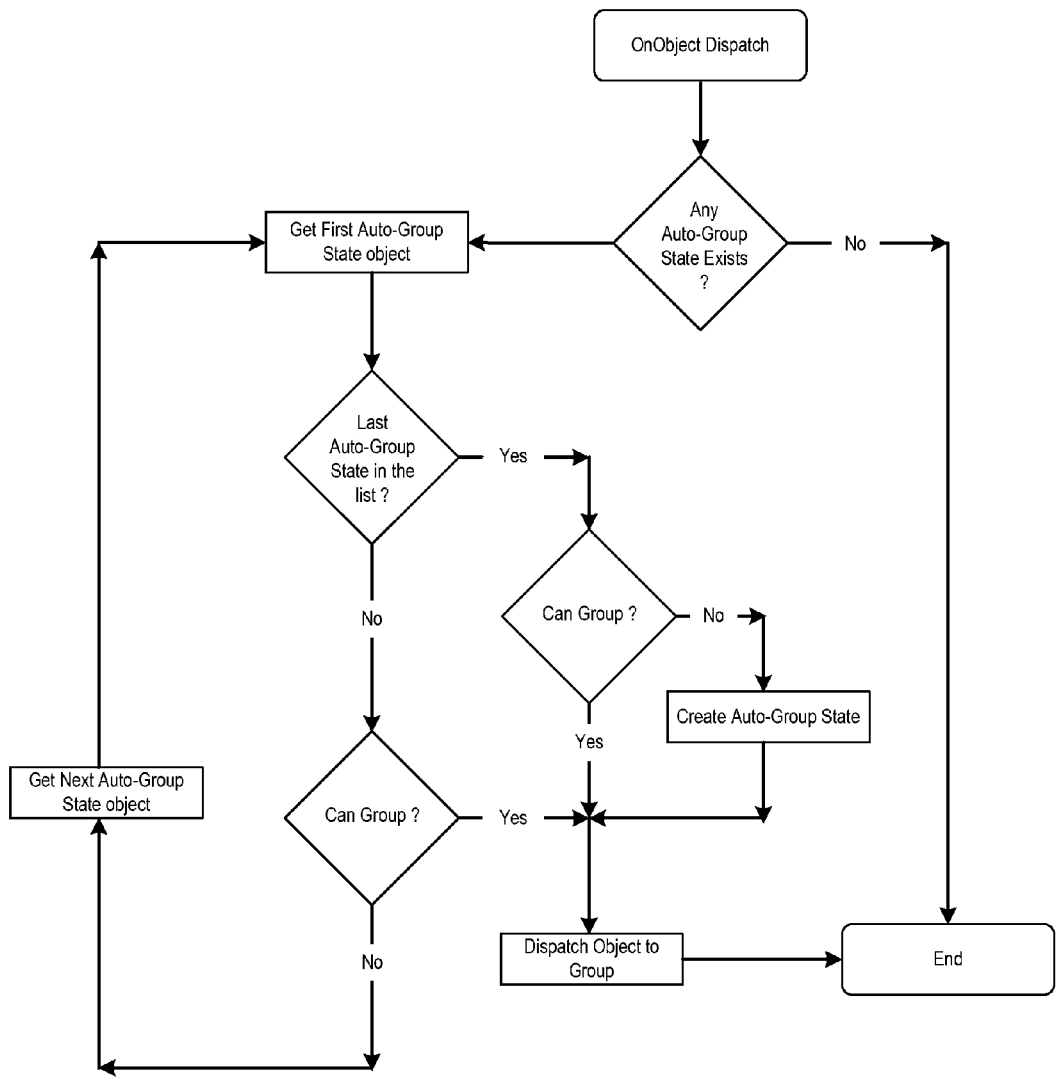
FIG. 8 is a flowchart showing steps taken during dispatching of the created annotation object.

When a Contact Up event occurs, again as triggered for example by a pen tool, a dispatching routine begins in order to dispatch the new annotation object created using the pen tool, as shown in FIGS. 7 and 8. In this description, dispatching an annotation object refers to the association of the annotation object with a page on the display surface of the interactive input system, and the potential grouping of the annotation object with one or more other annotation objects. In response to the Contact Up event, the pen tool object invokes a DoObjectDispatch method in order to cause the AutoGroupCoordinator object to retrieve from the AutoGroupStateList object a list of enabled AutoGroupState objects associated with that input stream. The CanGroup( ) method of each enabled AutoGroupState object associated with the input stream is passed the newly created annotation object in order to determine whether the newly created annotation object may be dispatched to a group associated with the AutoGroupState object (DispatchAndGroup). Alternatively, it may be grouped with the last dispatched annotation object associated with the input stream by creating an annotation group and dispatching both the newly created annotation object and the last dispatched annotation object to the annotation group (DispatchAndGroup). Alternatively, it is determined that the newly created annotation object is not to be grouped.

More particularly, in this embodiment, a newly created annotation object may be dispatched to the group or otherwise grouped with the previously dispatched annotation object if it is within a threshold distance of the temporary grouping region represented by the AutoGroupState object. More particularly, the newly created annotation object is grouped if it is within a threshold distance of the previously dispatched annotation object or a group of annotation objects created using the same input stream where the temporary grouping region has not expired. A newly created annotation group is designated as the "current" group in the AutoGroupState object for the next Contact Down/Up cycle.

In the event that there is no AutoGroupState object that represents a temporary grouping region within a threshold distance of the newly created annotation object, then a new AutoGroupState object representing a new temporary grouping region is created and associated with the newly created annotation object, and the newly created annotation object is dispatched without being added to any group.

In any event, the newly dispatched annotation object is designated as the last-dispatched annotation object for a next Contact Down/Up cycle.

Figure 9A:
FIGS. 9A to 9G illustrate a scenario in which annotations are being created on an interactive input system by two different users concurrently.
Figure 9B:
Figure 9B:
Figure 9C:
Figure 9C:
Figure 9D:
Figure 9D:
Figure 9E:
Figure 9E:
Figure 9F:
Figure 9F:
Figure 9G:
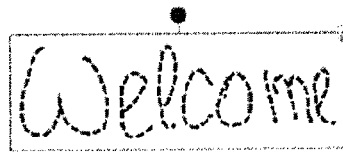
Figure 9G:

FIGS. 9*a* to 9*f* illustrate a scenario in which annotations are being created by two different users concurrently. In FIG. 9*a*, a first user is creating a "W" annotation with a pen tool, as indicated by the dashed line. In FIG. 9*b*, the first user has lifted his pen and a second user is creating an "H" annotation with a different pen tool, as indicated by the solid line. In FIG. 9*c*, the first user is creating a second annotation, this time an "e", and the second user has lifted his pen to begin creating his second annotation. In FIG. 9*d*, the first user has lifted his pen as the second user is creating his second annotation, this time an "e". This process continues on in a similar manner as has been described until, as shown in FIG. 9*e*, the first user finishes his word by completing his last annotation, this time an "e" at the end of "Welcome". The second user has lifted his pen and is ready to move on to write the letter "o". In FIG. 9*f*, both the first and second users have completed their words, which consist of the individual annotations. In FIG. 9*g*, each user has changed from a writing tool to a selection tool, and has touched one of the annotations in the word. In both cases, the entire word ("Welcome" or "Hello") is selected for each respective touch, because the individual annotations have been automatically and respectively grouped.

The method described above provides automatic grouping of annotation objects created from the same input stream, and does not group annotation objects created from different input streams. While this provides significant advantages particularly for multiple user interactive input systems where annotations are being created concurrently, it will be understood that alternatives are possible. For example, according to one alternative embodiment annotation objects created using multiple different input streams may, in some circumstances, be grouped together. However, it will be understood that determination of separate respective groupings for multiple users' annotations may occur simply because one user creates an annotation at a location that is greater than a the threshold distance away from an annotation created by another user, as shown in FIGS. 8*a* to 8*g*.

Grouping of multiple users' annotations may be useful, in certain applications. However, grouping of annotation objects created using multiple different input streams is preferably a configurable option, and/or is dependent upon the particular application in connection with which annotations are being made. For example, in a multiple user interactive input system, it may be desirable to have several students work together to spell out words or to otherwise collaborate to create a group of annotations that can later be manipulated as a whole. In such an instance, it would be useful to relax the time thresholds so that the students could have enough time to consider the words' correct spellings. In fact, a spelling game could be devised that, as students proceeded through game levels, reduced the time thresholds accordingly so as to increase the challenge at higher levels.

It will be understood that an interactive input system may not be capable of providing input stream identifiers unique to each input stream for distinguishing between certain input streams. In such a case, the interactive input system treats input streams that do not have distinguishable input stream identifiers provided by the system hardware, firmware or application program simply as a single input stream.

The methods described above may be embodied in one or more software applications comprising computer executable instructions executed by the processing structure 20. The software application(s) may comprise program modules including routines, programs, object components, data structures etc. and may be embodied as computer readable program code stored on a computer readable medium. The computer readable medium is any data storage device that can store data, which can thereafter be read by a processing structure 20. Examples of computer readable media include for example read-only memory, random-access memory, CD-ROMs, magnetic tape and optical data storage devices. The computer readable program code can also be distributed over a network including coupled computer systems so that the computer readable program code is stored and executed in a distributed fashion.

The methods described above may be applied to any interactive input system that can enable one or more users to provide ink inputs. As such, the methods and systems described herein are not limited for use with any particular input devices. For example, while the interactive input system described above is in the form of a multi-touch table supporting multiple users, because the methods described herein handle annotations created using one or more input streams, they are not limited for use with only a mouse, or a pen, or a finger. For example, an input stream may be generated via input devices through a remote desktop connection, by an application program automatically, as hardware level service events, or by any other means of creating an input stream.

Although embodiments have been described with reference to the drawings, those of skill in the art will appreciate that variations and modifications may be made without departing from the spirit, purpose and scope thereof as defined by the appended claims.

What is claimed is:

1. A method of handling objects representing annotations displayed on an interactive surface, comprising:
    creating a first annotation using a first input stream from a first user and displaying the first annotation on the interactive surface;
    creating a second annotation using a second input stream from a second user, at least partially concurrently with said first annotation and displaying the second annotation on the interactive surface;
    associating the first annotation with a first temporary grouping region of the interactive surface;
    associating the second annotation with a second temporary grouping region of the interactive surface;
    within a threshold amount of time following creation of the first and second annotations,
        creating a new further annotation using a new input stream from a third user and displaying the new further annotation on the interactive surface within a threshold distance of at least one of the first and second temporary grouping regions,
        comparing an identifier of the first and second input streams used to create the first and second annotations with an identifier of the new input stream used to create the new further annotation,
        in the event that the identifier of the first input stream and the identifier of the new stream are the same, associating the new further annotation with the first temporary grouping region,
        in the event that the identifier of the second input stream and the identifier of the new input stream are the same, associating the new further annotation with the second temporary grouping region, and
        otherwise in the event that the identifier of the new input stream is different than the identifiers of the first and second input streams, associating the new further annotation with a third temporary grouping region of the interactive surface; and
    in the event that the threshold amount of time passes before the new further annotation is created and displayed on the interactive surface within the threshold distance of the at least one of the first and second temporary grouping regions, disabling the first and second temporary grouping regions to thereafter prevent automatic grouping of any new further annotation with the first and second annotations.

2. The method of claim 1, wherein the first and second temporary grouping regions are bounding rectangles encompassing at least the first and second annotations, respectively.

3. An interactive input system comprising:
    a display surface; and
    processing structure communicating with the display surface, the processing structure being configured to:
    create a first annotation using a first input stream from a first user and cause display of the first annotation on the interactive surface;
    create a second annotation using a second input stream from a second user, at least partially concurrently with said first annotation and cause display of the second annotation on the interactive surface;
    associate the first annotation with a first temporary grouping region of the interactive surface;
    associate the second annotation with a second temporary grouping region of the interactive surface;
    within a threshold amount of time following creation of the first and second annotations,
        create a new further annotation using a new input stream from a third user and cause the display of the new further annotation on the interactive surface within a threshold distance of at least one of the first and second temporary grouping regions,
        compare an identifier of the first and second input streams used to create the first and second annotations with an identifier of the new input stream used to create the new further annotation,
        in the event that the identifier of the first input stream and the identifier of the new input stream are the same, associate the new further annotation with the first temporary grouping region, in the event that the identifier of the second input stream and the identifier of the new input stream are the same, associate the new further annotation with the second temporary grouping region, and otherwise in the event that the identifier of the new input stream is different than the identifiers of the first and second input streams, associate the new further annotation with a third temporary grouping region of the interactive surface; and in the event that the threshold amount of time passes before the new further annotation is created and displayed on the interactive surface within the threshold distance of the at least one of the first and second temporary grouping regions, disabling the first and second temporary grouping regions to thereafter prevent automatic grouping of any new further annotation with the first and second annotations.

4. The interactive input system of claim 3, wherein the first and second temporary grouping regions are bounding rectangles encompassing at least the first and second annotations, respectively.

5. A non-transitory computer readable medium embodying a computer program for handling objects representing annotations displayed on an interactive surface, the computer program comprising:

computer program code for creating a first annotation using a first input stream from a first user and displaying the first annotation on the interactive surface;

computer program code for creating a second annotation using a second input stream from a second user, at least partially concurrently with said first annotation and displaying the second annotation on the interactive surface;

computer program code for associating the first annotation with a first temporary grouping region of the interactive surface;

computer program code for associating the second annotation with a second temporary grouping region of the interactive surface;

computer program code for, within a threshold amount of time following creation of the first and second annotations, creating a new further annotation using a new input stream from a third user and displaying the new further annotation on the interactive surface within a threshold distance of at least one of the first and second temporary grouping regions, comparing an identifier of the first and second input streams used to create the first and second annotations with an identifier of the new input stream used to create the new further annotation, in the event that the identifier of the first input stream and the indentifier of the new input stream are the same, associating the new further annotation with the first temporary grouping region in the event that the identifier of the second input stream and the identifier of the new input stream are the same, associating the new further annotation with the second temporary grouping region, and otherwise in the event that the identifier of the new input stream is different than the identifiers of the first and second input streams, associating the new further annotation with a third temporary grouping region of the interactive surface; and computer program code for disabling the first and second temporary grouping regions to thereafter prevent automatic grouping of any new further annotation with the first and second annotations, in the event that the threshold amount of time passes before the new further annotation is created and displayed on the interactive surface within the threshold distance of the at least one of the first and second temporary grouping regions.

6. The method of claim 1, wherein a user is permitted to manually associate either the first or second annotation with the new further annotation.

7. The system of claim 3, wherein a user is permitted to manually associate either the first or second annotation with the new further annotation.

8. The computer readable medium of claim 5, wherein a user is permitted to manually associate either the first or second annotation with the new further annotation.

9. An apparatus comprising:

an interactive surface;

memory storing executable instructions; and a processing unit communicating with said interactive surface and said memory, said processing unit being configured to, upon execution of said executable instructions, cause said apparatus at least to:

create a first annotation using a first input stream from a first user and cause display of the first annotation on the interactive surface;

create a second annotation using a second input stream from a second user, at least partially concurrently with said first annotation and cause display of the second annotation on the interactive surface;

associate the first annotation with a first temporary grouping region of the interactive surface;

associate the second annotation with a second temporary grouping region of the interactive surface;

within a threshold amount of time following creation of the first and second annotations, create a new further annotation using a new input stream from a third user and cause the display of the new further annotation on the interactive surface within a threshold distance of at least one of the first and second temporary grouping regions, compare an identifier of the first and second input streams used to create the first and second annotations with an identifier of the new input stream used to create the new further annotation, in the event that the identifier of the first input stream and the identifier of the new input stream are the same, associate the new further annotation with the first temporary grouping region, in the event that the identifier of the second input stream and the identifier of the new input stream are the same, associate the new further annotation with the second temporary grouping region, and otherwise in the event that the identifier of the new input stream is different than the identifiers of the first and second input streams, associate the new further annotation with a third temporary grouping region of the interactive surface; and in the event that the threshold amount of time passes before the new further annotation is created and displayed on the interactive surface within the threshold distance of the at least one of the first and second temporary grouping regions, disabling the first and second temporary grouping regions to thereafter prevent automatic grouping of any new further annotation with the first and second annotations.

10. The apparatus of claim 9, wherein the first and second temporary grouping regions are bounding rectangles encompassing at least the first and second annotations, respectively.

11. The apparatus of claim 9, wherein said processing unit is further configured to, upon execution of said executable instructions, cause said apparatus to permit a user to manually associate either the first or second annotation with the new further annotation.

12. The apparatus of claim 9, wherein said interactive surface is either horizontally oriented or vertically oriented.

\* \* \* \* \*